United States Patent Office 3,386,945
Patented June 4, 1968

3,386,945
THERMALLY STABLE SEALANTS FROM FLUO-
ROALKYL SILOXANES, ZIRCONIUM SILICATE,
AND CERIC HYDRATE
James F. Bartell and Marcus E. Ross, Midland, Mich., assignors to Dow Corning Corporation, Midland, Mich., a corporation of Michigan
No Drawing. Filed Jan. 12, 1966, Ser. No. 520,065
3 Claims. (Cl. 260—37)

This invention relates to thermally stable silicone sealants, particularly silicone sealants resistant to petroleum fuels, such as jet aircraft fuels.

Sealants which are thermally stable under a certain condition of exposure, such as salt water, have been developed, but today special sealants are required for each specific use or unique condition of exposure. One such sealant is required for use in the latest aircraft and aerospace vehicles. This sealant must perform under arctic and tropic conditions alike and still resist the heat generated by the aircraft, in addition to resisting deterioration of properties when contacted by fuels, greases and other materials used on and by such aircraft. The sealants for aerospace vehicles must likewise withstand equivalent or harsher conditions.

An object of this invention is to provide a sealant suitable for use in modern aircraft and aerospace vehicles. Another object of this invention is to provide a sealant which is thermally stable and which resists deterioration from aircraft fuels. Another object of this invention is to provide a thermally stable sealant suitable as a filleting sealant. Still another object of this invention is to provide a sealant which cures at room temperature. These and other objects and advantages will become apparent from the following detailed description.

This invention relates to a room temperature vulcanizable composition consisting essentially of (1) 100 parts by weight of a polysiloxane of the formula $$HO([(CF_3CH_2CH_2)CH_3SiO]_x[(CH_3)_2SiO]_y)H$$

in which $x$ and $y$ are positive integers such that the viscosity is from 25,000 to 350,000 cs. at 25° C., and $y$ is no more than 10 percent of the sum of $x+y$, (2) From 5 to 15 parts by weight of vinyltriacetoxysilane, (3) From 5 to 25 parts by weight of a reinforcing silica, (4) From 50 to 100 parts by weight of zirconium silicate and (5) From 1 to 5 parts of ceric hydrate.

The polysiloxanes of the present invention are well known in the art. The operable polysiloxanes for this invention have the formula

in which $x$ and $y$ are positive integers such that the viscosity is from 25,000 to 350,000 cs. at 25° C., preferably from 100,000 to 150,000 cs. at 25° C. The amount of $(CH_3)_2SiO$ units present should not be greater than 10 percent of the total number of siloxane units in the polysiloxane, thus $y$ has a maximum of 10 percent of the sum of $x+y$. Preferably, the polysiloxane contains no dimethylsiloxane units. Amounts of dimethylsiloxane units greater than 10 percent greatly reduces the fuel resistance of the room temperature vulcanized composition and the products are not satisfactory for filleting sealants in aircraft. Polysiloxanes having viscosities outside the range disclosed above are unsatisfactory in that the uncured composition formed from such polysiloxanes have consistencies which are too difficult to work with conveniently.

The polysiloxanes (1) can be made by a method as described by O. K. Johannson in U.S. Patent No. 3,002,951 in which cyclotrisiloxanes are polymerized under alkaline conditions to the corresponding hydroxyl endblocked polymers. The cyclotrisiloxanes are described by Pierce and Holbrook in U.S. Patent No. 2,979,519. Other methods can be found in U.S. Patents Nos. 3,006,878 and 3,146,251 and in Canadian Patents Nos. 576,302 and 586,917.

The vinyltriacetoxysilane (2) can be present in amounts from 5 to 15 parts by weight, preferably from 8 to 12 parts by weight. Other crosslinkers have been used in room temperature vulcanizable systems, but these other crosslinkers do not provide a satisfactory heat stable product.

The reinforcing silica (3) can be any reinforcing silica. Preferably, the reinforcing silica is treated with organosilicon compounds, such as described in U.S. Patent No. 2,863,846. The preferred treated reinforcing silica is prepared by the method described in copending U.S. patent application by Eric D. Brown and James Franklin Hyde, Ser. No. 436,293, filed Mar. 1, 1965, fully incorporated herein by reference. The silica is treated by contacting the silica with cyclic 3,3,3-trifluoropropylmethylsiloxane of the formula

at a temperature of 15° to 170° C. in the presence of at least 0.2 mol percent based on the moles of silica of ammonium hydroxide, ammonium carbonate, ammonium halides, ammonium salts of carboxylic acids and tertiary amines. The silica produced is a hydrophobic reinforcing silica. The silica preferably has a surface area of at least 100 square meters per gram. The silica treated by the method described in U.S. Patent No. 2,863,846 is preferably treated with 3,3,3-trifluoropropyltrichlorosilane, 3,3,3-trifluoropropylmethyldichlorosilane, 3,3,3-trifluoropropyldimethylmonochlorosilane and similar compounds and combinations thereof. The amount of reinforcing silica used can be from 5 to 25 parts by weight per 100 parts of the polysiloxane (1), preferably from 7 to 15 parts by weight. When the amount of silica is outside the limits set forth above, the consistency of the uncured composition is unsatisfactory. When too much silica is used, the viscosity is too high to use without adding solvents and solvents are not desirable for use with these room temperature vulcanizable compositions. When too little silica is used, the strength of the finally cured product does not increase enough to be of any value.

The zirconium silicate (4) can be present in an amount from 50 to 100 parts by weight per 100 parts by weight of the polysiloxane (1), preferably from 60 to 80 parts by weight. The zirconium silicate is added in a finely divided form or powder which can be purchased commercially. When the zirconium silicate is present in amounts outside the limits set forth above the heat stability is unsatisfactory.

Ceric hydrate (5) can be present in an amount from 1 to 5 parts by weight per 100 parts by weight of the polysiloxane (1), preferably from 1 to 3 parts by weight. The ceric hydrate is a partially hydrated form of ceric oxide in which the general formula might be written as

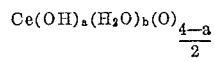

where $a$ is at least 0.1 and/or $b$ is at least 0.1. Another way in which a general formula for ceric hydrate might be written is $CeO_2 \cdot nH_2O$, where $n$ has a value from 0.1 to 1.1 inclusive. Ceric hydrate is believed to be composed of —OH radicals bonded to the cerium atom by primary chemical bonds and water molecules bonded to the cerium atom through oxygen atoms by hydrogen bonding or by association of the oxygen atom of the water molecule directly to the cerium atom. Inasmuch as the exact chemical structure or formula is unknown, the best description for ceric hydrate which will be operative in this invention to provide the unique properties is a compound of cerium in the tetravalent state wherein the remaining atoms of the compound are oxygen atoms and hydrogen atoms, said hydrogen atoms being present as radicals of the formula —OH or as molecules of the formula $H_2O$ or both. The amount of hydrogen atoms, determined as $H_2O$ molecules, is from 1 to 10 weight percent based on the total weight of ceric hydrate. Preferably, the amount of hydrogen atoms, determined as $H_2O$ molecules, is from 4 to 8 weight percent based on the total weight of ceric hydrate.

It has been found that the heat stability, as well as the fuel resistance, cannot be obtained at the level achieved by this invention unless both zirconium silicate and ceric hydrate are used. Replacing the ceric hydrate by other ceric compounds such as ceric oxide produce inferior products which do not meet the high standards required. Also using zirconium silicate or ceric hydrate alone or in combination with other materials will not provide the heat stability or fuel resistance acceptable for filleting sealants.

This invention does not reside fully in the combination of zirconium silicate and ceric hydrate but in the entire composition. Each ingredient and the amount in which it is present are necessary to achieve a filleting sealant which can be used in the modern aircraft of today, such as the military jet aircraft or in the aerospace vehicles.

The compositions can be made by mixing the polysiloxane (1), the reinforcing silica (3), the zirconium silicate (4) and the ceric hydrate (5). The mixing can be done by hand or other suitable means and then milled on a three roll mill. The mixture thus obtained is then placed in a mixer capable of mixing in the absence of air and moisture. The air and moisture is then evacuated from the mixture and thereafter the vinyltriacetoxysilane is added and mixed therein. Room temperature is used throughout the mixing procedure. The composition obtained can be kept indefinitely by storing in the absence of moisture or water in any form. The ingredients used need not be completely void of water, but no more than trace amounts which are normally found in some ingredients, such as silica, should be permitted for best results particularly if the uncured composition is to be stored over long periods of time.

This composition has become known as a one package sealant. When this composition is stored in a container it can be deposited directly into the position where it is to be cured. No mixing is required or no other materials are added. The composition thus deposited cures to a rubber at room temperature by contact with moisture. The cured product of this invention is heat stable up to 550° F. and retains at least 80 perccent of its properties after being immersed or in contact with vapors of jet aircraft fuels for 72 hours at 450° F.

The following examples are illustrative only and should not be constructed as limiting the invention which is properly delineated in the appended claims.

Example 1

A filleting sealant was prepared by mixing 700 g. of a hydroxyl-endblocked 3,3,3-trifluoropropylmethylsiloxane polymer having a viscosity of 315,000 cs. at 25° C., 49 g. of silica having a surface area of 400 m.²/g. which was treated with cyclic 3,3,3-trifluoropropylmethylsiloxane by the method of Brown and Hyde described in copending Ser. No. 436,293, 490 g. of zirconium silicate and 14 g. of ceric hydrate having approximately 3.3 weight percent water. The mixture was then milled on a three roll mill and placed in a commercial mixer wherein air and moisture can be excluded from the mixture. After the air and moisture were evacuated from the mixer, 70 g. of vinyltriacetoxysilane was added and mixed. The final mixture was allowed to cure at room temperature for 7 days exposed to air in moldings of 8 in. x 8 in. x 1/16 in. Sample A was heated at 450° F. for 72 hours while immersed in a hydrocarbon fuel which is used in jet aircraft. Sample B was heated at 450° F. for 72 hours while being exposed to the hot vapors of the jet aircraft fuel. The fuel vapors were brought into contact with the sample in a bomb containing nitrogen and 15 ml. of the fuel. The properties of the samples before heating and after heating are presented below.

|  | After Cure, 7 days R.T. | Sample After Heating | |
|---|---|---|---|
|  |  | A | B |
| Durometer, Shore "A" | 37 | 32 | 36 |
| Tensile Strength p.s.i. | 495 | 445 | 482 |
| Elongation, percent | 240 | 310 | 370 |

Example 2

A filleting sealant was prepared by mixing 500 g. of a hydroxyl-endblocked 3,3,3-trifluoropropylmethylsiloxane polymer having a viscosity of 50,000 cs. at 25° C., 85 g. of the silica as described in Example 1, 350 g. of zirconium silicate and 20 g. of ceric hydrate paste which was a mixture of 50 parts by weight ceric hydrate having 6.6 weight percent water and 50 parts by weight of a trimethylsilyl endblocked dimethylsiloxane. The mixture was thereafter prepared as in Example 1 wherein 50 g. of vinyltriacetoxysilane was added. A sample cured for 7 days at room temperature had a durometer of 55, a tensile strength of 620 p.s.i. and an elongation of 180%. After heating with the fuel vapors, as Sample B in Example 1, the sample had a durometer of 56, a tensile strength of 520 p.s.i. and an elongation of 190%.

Example 3

A sealant prepared as in Example 1 having the following composition was prepared: 500 g. of a hydroxyl endblocked 3,3,3-trifluoropropylmethylsiloxane polymer having a viscosity of 68,000 cs. at 25° C., 60 g. of a high surface area silica treated with 3,3,3-trifluoropropylmethyldichlorosilane as described in U.S. 2,863,846, 350 g. of zirconium silicate, 10 g. of the ceric hydrate having 6.6 weight percent of water and 60 g. of vinyltriacetoxysilane. The mixture was cured for 7 days at room temperature and had an elongation of 205%. After undergoing the immersion test as described for Sample A of Example 1, the elongation was 340%. After undergoing the vapor test as described for Sample B of Example 1, the elongation was 300%.

Example 4

A sealant was prepared by the procedure of Example 1. The composition was 100 parts by weight of a hydroxyl-endblock 3,3,3-trifluoropropylmethylsiloxane polymer having a viscosity of 160,000 cs. at 25° C., 7 parts by weight silica as described in Example 3, 70 parts by weight zirconium silicate, 2 parts ceric hydrate as described in Example 3 and 10 parts by weight of vinyltriacetoxysilane. The sealant cured for 7 days at room temperature and had an elongation of 330%. After heating for 72 hours at 482° F. in an air-circulating oven, the elongation was 345%. After the vapor test as described for Sample B of Example 1, the elongation was 420%.

Example 5

A sealant is prepared when the following composition is compounded according to the procedure of Example 1: 100 parts by weight of hydroxyl endblocked 3,3,3-trifluoropropylmethylsiloxane polymer containing 10 mol percent dimethylsiloxane units and having a viscosity of 25,000 cs. at 25° C., 5 parts by weight of a reinforcing silica, 50 parts by weight of zirconium silicate, 1 part by weight of ceric hydrate having 1 weight percent water based on the total weight of ceric hydrate and 5 parts by weight of vinyltriacetoxysilane.

Example 6

A filleting sealant is prepared when the following composition is compounded according to the procedure of Example 1: 100 parts by weight of a hydroxyl endblocked 3,3,3-trifluoropropylmethylsiloxane polymer having a viscosity of 350,000 cs. at 25° C., 25 parts by weight of a reinforcing silica, 100 parts by weight of zirconium silicate, 5 parts by weight of ceric hydrate having 10 weight percent water based on the total weight of ceric hydrate and 15 parts by weight vinyltriacetoxysilane.

Example 7

When the following ingredients are mixed according to the procedure of Example 1, a solvent resistant sealant is obtained which is stable in the absence of moisture and will cure upon exposure to moisture:

100 g. of $HO[(CF_3CH_2CH_2)CH_3SiO]_xH$ where $x$ has an average value such that the viscosity is 100,000 cs. at 25° C., 15 g. of the silica of Example 1, 60 g. of zirconium silicate, 3 g. of ceric hydrate having 4 weight percent water and 8 g. of vinyltriacetoxysilane.

Example 8

When the following ingredients are mixed according to the procedure of Example 1, a solvent resistant sealant is obtained which is stable in the absence of moisture and which will cure at room temperature when exposed to moisture:

100 g. of $HO[(CF_3CH_2CH_2)CH_3SiO]_xH$, where $x$ has an average value such that the viscosity is 150,000 cs. at 25° C., 10 g. of the silica of Example 3, 80 g. of zirconium silicate, 2 g. of ceric hydrate having 8 weight percent water, and 9 g. of vinyltriacetoxysilane.

That which is claimed is:

1. A room temperature vulcanizable composition consisting essentially of (1) 100 parts by weight of a polysiloxane of the general formula $$HO([CF_3CH_2CH_2)CH_3SiO]_x[(CH_3)_2SiO]_yH$$

in which $x$ and $y$ are positive intgers such that the viscosity is from 25,000 to 350,000 cs. at 25° C. and $y$ is no more than 10 percent of the sum of $x+y$, (2) from 5 to 15 parts by weight of vinyltriacetoxysilane, (3) from 5 to 25 parts by weight of a reinforcing silica, (4) from 50 to 100 parts by weight of zirconium silicate and (5) from 1 to 5 parts of ceric hydrate wherein the cerium atoms are in the tetravalent state, the other atoms of the compound are hydrogen atoms and oxygen atoms, said hydrogen atoms are present as —OH radicals, $H_2O$ molecules or both, and said hydrogen atoms are present in an amount, determined as $H_2O$ molecules, from 1 to 10 weight percent inclusive based on the total weight of ceric hydrate.

2. The room temperature vulcanizable composition according to claim 1 wherein the viscosity of (1) is from 100,000 to 150,000 cs. at 25° C. and $y$ is 0, (2) is present in an amount from 8 to 12 parts by weight, (3) is present in an amount from 7 to 15 parts by weight, (4) is present in an amount from 60 to 80 parts by weight, and (5) is present in an amount from 1 to 3 parts by weight and the amount of hydrogen atoms, determined as $H_2O$ molecules, is from 4 to 8 weight percent based on the total weight of the ceric hydrate.

3. The room temperature vulcanizable composition according to claim 2, wherein the amounts of ingredients are 10 parts by weight of (2), 7 parts by weight of (3), 70 parts by weight of (4) and 2 parts by weight of (5).

References Cited

UNITED STATES PATENTS 2,999,076 9/1961 Talcott.
3,061,565 10/1962 Collings.
3,142,655 7/1964 Bobear.
3,192,175 6/1965 Russell.

MORRIS LIEBMAN, *Primary Examiner.*

J. E. CALLAGHAN, *Assistant Examiner.*

UNITED STATES PATENT OFFICE
CERTIFICATE OF CORRECTION

Patent No. 3,386,945　　　　　　　　Dated: June 4, 1968

JAMES F. BARTELL and MARCUS E. ROSS

It is certified that errors appear in the above identified patent and that said Letters Patent are hereby corrected as shown below:

Col. 3, line 39 - "exacuated" should read "evacuated"

Col. 6, line 3 - the formula $HO([CF_3CH_2CH_2)CH_3SiO]_x[(CH_3)_2SiO]_y$ should read $NO([(CF_3CH_2CH_2)CH_3SiO]_x[(CH_3)_2SiO]$ Signed and sealed this 21st day of March 1972.

(SEAL)
Attest:

EDWARD M. FLETCHER, JR.　　　　　ROBERT GOTTSCHALK
Attesting Officer　　　　　　　　Commissioner of Patents